Patented June 17, 1930

1,765,013

UNITED STATES PATENT OFFICE

PAUL R. HERSHMAN, OF CHICAGO, ILLINOIS, ASSIGNOR OF ONE-FOURTH TO C. O. SETHNESS, ONE-FOURTH TO C. H. SETHNESS, AND ONE-FOURTH TO PAUL RUDNICK, ALL OF CHICAGO, ILLINOIS

HYPOCHLORATE IN COLLOIDAL FORM AND PROCESS OF MAKING THE SAME

No Drawing. Application filed March 28, 1927. Serial No. 179,189.

It is known that water soluble hypochlorites have valuable disinfecting and bleaching properties, the problem being to produce them in a water soluble form that will permanently retain the available chlorine. It has been proposed to produce a product of this kind by dissolving alkali hypochlorite in the proportion of 1:20 solutions in colloids; soap solutions being used as the colloids. Only a very weak compound can be obtained by this method, the compound being furthermore very unstable because the fatty acids are readily oxidized at the expense of the hypochlorites, causing practically all of the available chlorine to disappear. Muspratt describes the evaporation of sodium hypochlorite in vacuum. The disadvantages of this product are very low melting point and hygroscopicity.

The object of the present invention or discovery is to produce a stable water soluble product consisting of hypochlorites in a colloidal form and containing a large amount of available chlorine.

A further object of the present invention is to devise a simple and novel process for producing my improved product.

I have discovered that a very stable, non-hygroscopic, water-soluble, dry product of high melting point, containing water-soluble hypochlorite can be obtained in any one of several ways. Thus, a solution of hypochlorites, preferably stabilized, may be evaporated in the presence of a water-soluble colloid which will not chemically react therewith. Or, hypochlorites of the alkaline earth group may be precipitated with such alkali solutions as will produce water-soluble hypochlorites and a colloidal precipitate as, for example, tri-calcium phosphate or magnesium silicate.

In order that my invention and its practice may be fully understood I shall explain several preferred ways in which my invention may be carried out.

First. A solution containing about ten percent of available chlorine in form of —Cl
Na$_2$—OCl, is mixed with equal parts of a solution of sodium silicate of 40° B. and evaporated, either to gelatinous consistency or to a form that will permit it to be easily powdered.

Second. A solution of sodium hypochlorite, prepared by neutralizing caustic soda with hypochlorous acid, and containing say ten percent of available chlorine in the form of NaOCl, is evaporated with one volume of sodium silicate in the same manner as described in the first example.

Third. One hundred parts of finely ground chloride of lime are ground with a little water, to the consistency of dough, and in the same way, one hundred twenty five parts of sodium phosphate are prepared, then the latter is slowly added to the first and ground together. A colloid of about the consistency of jelly will be obtained, which can be used for bleaching, washing, added to soap, etc., either with or without previous drying, and which will have no effect whatever on the fatty acids contained in the soap.

Fourth. One hundred parts of aluminum sulphate are mixed in dry form with fifty parts of sodium-carbonate, and two hundred parts of chloride of lime containing thirty percent of available chlorine. The resulting product when brought in contact with a small amount of water will form a gelatinous mass containing all chlorine in water-soluble form.

The proportions given in the foregoing formulas may, of course, be varied; these particular proportions being only such as I have found in practice to be satisfactory. Therefore, I do not desire to be limited to these particular proportions or to particular ingredients or steps or methods except to the extent pointed out in the definitions of my invention constituting the appended claims.

I claim:

1. The process of making solid or semi-solid compounds containing water-soluble hypochlorite, which consists in mixing compounds, containing hypochlorites, with colloids or substances capable of precipitating a colloidal mass that can be dried by evaporation, and then evaporating the mass until it is dry.

2. The process of making solid or semi-solid compounds containing water-soluble hypochlorite, which consists in mixing compounds, containing hypochlorite, with a substance capable of precipitating a colloidal mass, and then evaporating the mass to dryness.

3. The process of making solid or semi-solid compounds containing water-soluble hypochlorite, which consists in mixing water-soluble compounds containing hypochlorites with substances capable of forming a colloidal precipitate with the base of the hypochlorite, and then evaporating the product at least to a point where it loses its liquid character.

In testimony whereof, I sign this specification.

PAUL R. HERSHMAN.